(12) United States Patent
Dodge

(10) Patent No.: US 9,026,567 B2
(45) Date of Patent: May 5, 2015

(54) PUBLISH-SUBSCRIBE SYSTEM

(75) Inventor: Dan Dodge, Ottawa (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 437 days.

(21) Appl. No.: 12/780,400

(22) Filed: May 14, 2010

(65) Prior Publication Data

US 2011/0282921 A1  Nov. 17, 2011

(51) Int. Cl.
| | | |
|---|---|---|
| G06F 17/30 | (2006.01) | |
| G06F 9/54 | (2006.01) | |
| H04L 29/06 | (2006.01) | |

(52) U.S. Cl.
CPC .......... *G06F 9/542* (2013.01); *G06F 17/30115* (2013.01); *G06F 17/30126* (2013.01); *G06F 17/30864* (2013.01); *G06F 17/30867* (2013.01); *G06F 17/3089* (2013.01); *H04L 65/1069* (2013.01)

(58) Field of Classification Search
CPC .......... G06F 17/3089; G06F 17/30115; G06F 17/30126
USPC .............................................. 707/822, E17.01
See application file for complete search history.

(56) References Cited

U.S. PATENT DOCUMENTS

| | | | |
|---|---|---|---|
| 6,549,916 B1 * | 4/2003 | Sedlar ................................... 1/1 |
| 6,633,919 B1 * | 10/2003 | Marcotte ....................... 709/237 |
| 2002/0147849 A1 | 10/2002 | Wong et al. | |
| 2006/0041593 A1 * | 2/2006 | Borthakur et al. ............ 707/200 |
| 2007/0088711 A1 * | 4/2007 | Craggs ............................ 707/10 |
| 2007/0266392 A1 * | 11/2007 | Thoelke ........................ 719/313 |
| 2008/0052323 A1 * | 2/2008 | Dodge et al. ................... 707/201 |
| 2008/0086728 A1 * | 4/2008 | Lam et al. ......................... 718/1 |
| 2009/0199051 A1 * | 8/2009 | Jann et al. ....................... 714/57 |
| 2009/0228563 A1 | 9/2009 | Jones et al. | |
| 2009/0307374 A1 | 12/2009 | Morris | |

FOREIGN PATENT DOCUMENTS

| | | |
|---|---|---|
| EP | 1 130 845 A2 | 9/2001 |
| EP | 1 898 322 A1 | 3/2008 |

\* cited by examiner

*Primary Examiner* — Shiow-Jy Fan
(74) *Attorney, Agent, or Firm* — Brinks Gilson & Lione

(57) ABSTRACT

A publish-subscribe system publishes events associated with one or more objects represented by files within a file system. The files may be accessed using a file system application programming interface by both publishers and subscribers. Each file may contain an identifier and a plurality of attributes and each attribute may have a name and a value. The files and the associated objects may be persisted to compensate for restarts and failures of a computing platform hosting the system for publish-subscribe.

11 Claims, 7 Drawing Sheets

Results of a read operation on a
directory opened in delta mode

@Time                     600
position::18

@Time
position::19

@PlayCurrent
artist::The Beatles
genre::Pop

Figure 6

PUBLISH-SUBSCRIBE SYSTEM

BACKGROUND OF THE INVENTION

1. Technical Field

This disclosure relates to a publish-subscribe communication system.

2. Related Art

A publish-subscribe system may allow publishers to publish events associated with objects that may be distributed to many recipients known as subscribers. Rather than sending publish events to specific receivers, each publish event is associated with one of one or more objects. Subscribers interested in one or more objects may elect to receive publish events by subscribing to objects of interest, with or without knowledge of the publishers.

There is a proliferation of different publish-subscribe systems with little uniformity in the interfaces for publishers and subscribers. Software developers may be reluctant to adapt their publisher and subscriber application implementations to multiple interfaces and as a result the potential for leveraging these application implementations is reduced.

SUMMARY

A publish-subscribe system publishes events associated with one or more objects represented by files within a file system. The publish-subscribe files may be accessed through file system software implemented by applications, libraries, and/or an operating system stored on a non-transitory medium. The file system software may comprise a file system application programming interface that provides access to publishers and subscribers. The publish-subscribe files may comprise an identifier and one or more attributes. The attributes may be associated with a name and may include one or more values. The publish-subscribe files and some or all of the associated objects may persist over restarts and failures of a computing platform hosting the publish-subscribe system and may be retained in a persistent file system and/or a non-volatile medium such as a storage device.

In some publish-subscribe systems one or more publishers may be coupled to one or more subscribers through an asynchronous device that publishes events associated with one or more objects that may not be synchronized with other parts of a communication system. A local or remote controller or device in a distributed architecture may publish events using a common file system application programming interface. The subscribers may access the publish events though the same file system application programming interface used by the publishers. The subscribers may receive notifications (e.g., such as the creation, modification and deletion of publish-subscribe files) and retrieve details of the events using the same file system application programming interface.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 6 is an exemplary output of a read operation of a directory opened in a delta mode.

DETAILED DESCRIPTION OF THE PREFERRED EMBODIMENTS

A publish-subscribe system allows publishers of messages to send messages to subscribers through a publish-subscribe file system that may be stored on a non-volatile storage medium. By distilling the functionality of one or more publish-subscribe architectures into a hierarchical file arrangement, the publish-subscribe system may hide the details of one or more static or dynamic publish-subscribe systems. The system allows for greater scalability, device independence, and a more dynamic and flexible communication network.

Figure 1:
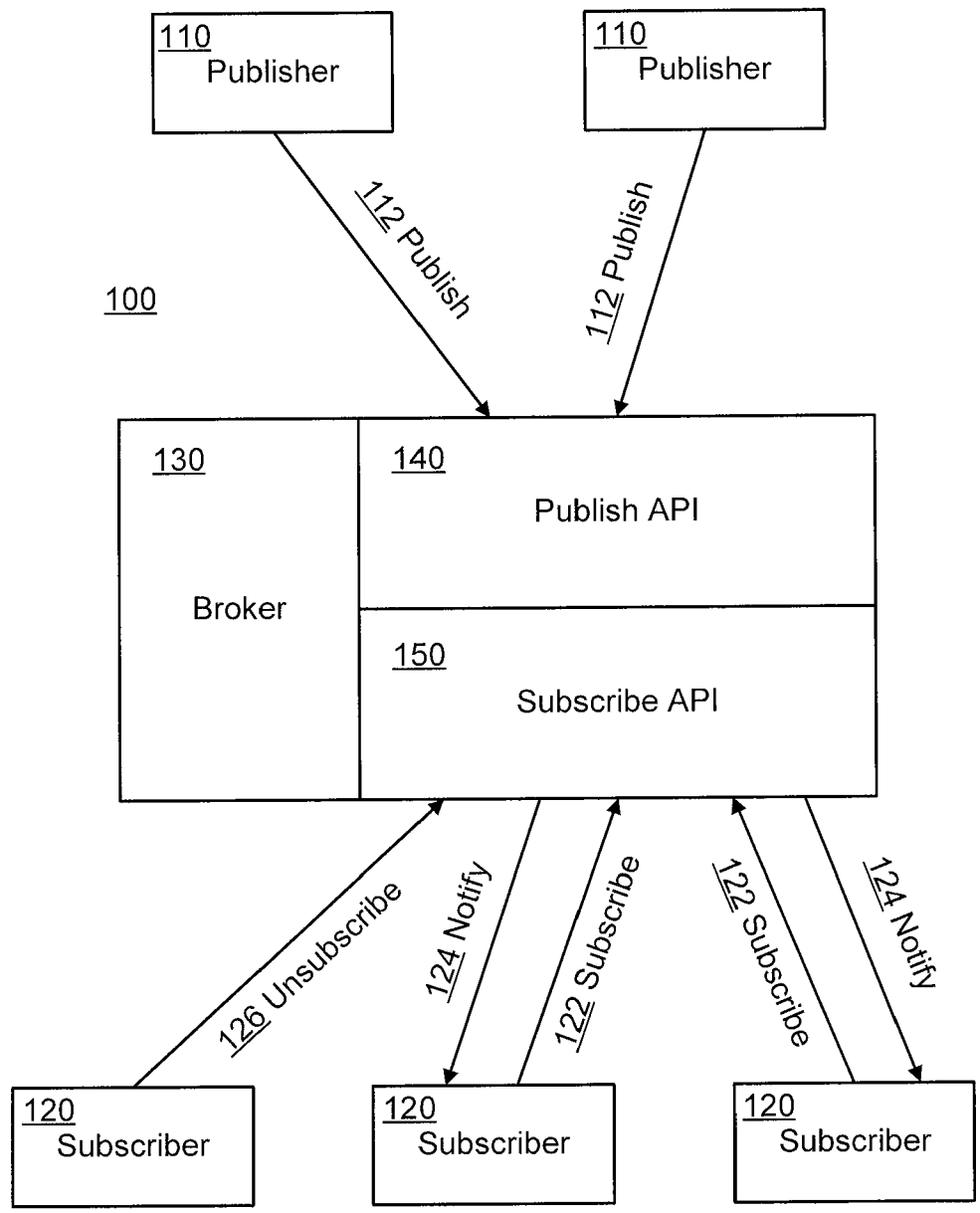
FIG. 1 is a publish-subscribe system.

FIG. 1 is a publish-subscribe system 100. The publishers 110 and the subscribers 120 may be loosely-coupled as either may be without knowledge of the other. In the publish-subscribe system of FIG. 1, middleware such as a broker 130 may provide a store-and-forward functionality to route data-bearing events between the publisher 110 and the subscriber 120 applications. Publishers 110 may publish events 112 to the broker 130 through a publish application programming interface 140. Subscribers 120 may transmit subscribe 122 and unsubscribe 126 requests through a wireless and/or physical mediums and networks to receive notifying events 124 though a subscribe application program interface 150. The notify events 124 may forward the contents of publish events 112 to distributed devices and subscribers 120. In some systems, published events 112 are not persisted and do not survive a system restart or a failure of the publish-subscribe system 100.

Figure 2:
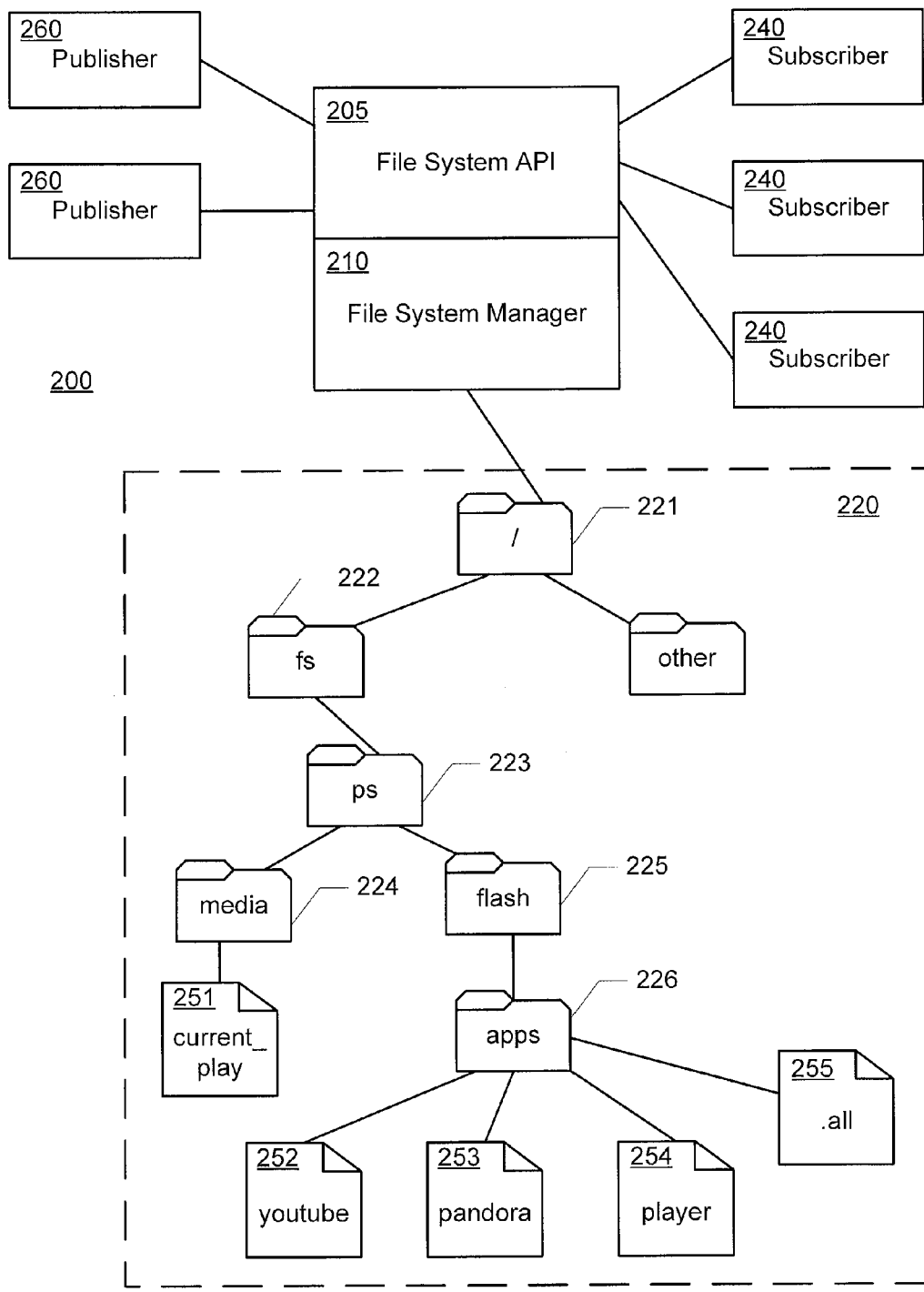
FIG. 2 is an alternative publish-subscribe system.

FIG. 2 is an alternative publish-subscribe system 200. The system 200 may comprise a file system application programming interface 205, a file system manager 210, file system content 220, one or more publisher applications 260, and one or more subscriber applications 240. In some systems, the file system application programming interface 205 provides functionality (e.g., procedure calls) that may include, for example, open( ) write( ) read( ) and close( ) that may be invoked by processors and applications (e.g., publisher applications 260 and subscriber applications 240). The syntax or protocol that is used to make calls these or other functions may require more or less call detail, may or may not include the data and/or storage location that may drive them, may have different semantics, syntax, and/or forms (as many different programming languages and interface specifications may be used). In some systems, the invocation of the function may include arguments such as, for example, a pathname, a file descriptor, input variables, and return variables. These and other systems may include a file system application programming interface 205 of a computer system that may be compliant with standards established by a standard setting organization. For example, some publish-subscribe systems 200 are compliant with a file system application programming interface standard adopted by the Institute of Electrical and Electronics Engineers (IEEE). The IEEE Portable Operating System Interface (POSIX) 1003.1 specification is incorporate herein by reference in its entirety. While some or all of systems described may be POSIX compliant and include the functionality of POSIX specification, the publish-subscribe systems are not limited to such standard and may be compliant with multiple standards or no standards.

In FIG. 2, the file system manager 210 that may be hosted by a server or controller. The file system manager 210 may invoke translations from the original or native commands received from the publisher or subscriber into the corresponding operations supported on the file system content 220 that may be distributed or local to the server or controller hosting the file system manager. Such operation may include, for example, create, modify and delete, mount-points, transactionality (e.g., snapshots and copy-on-write (COW)) and other similar or different functions.

In FIG. 2, the file system content 220 includes directories and files that may be arranged in a hierarchical arrangement as shown or in a non-hierarchical arrangement (not shown). Each file and directory may have a corresponding file name or directory name. The file system content may include at least one publish-subscribe mount-point (e.g., /fs/ps) 223 under which may be contained a plurality of publish-subscribe files (e.g., publish-subscribe files 251, 252, 253, 254) and directories (e.g., directories 224, 225, 226). Some or each publish-subscribe file may represent a published object in the publish-subscribe system 200. Some or each file and directory may be uniquely identified (e.g., addressed) within a pathname space by its pathname. In some systems, a pathname for a given file or directory may be comprised of a mount-point name followed by the names of each of any intervening directories separated by a separator character (e.g., '/'), followed by the given file name or directory name. In alternative systems, pathnames may have different formats.

Figure 3:
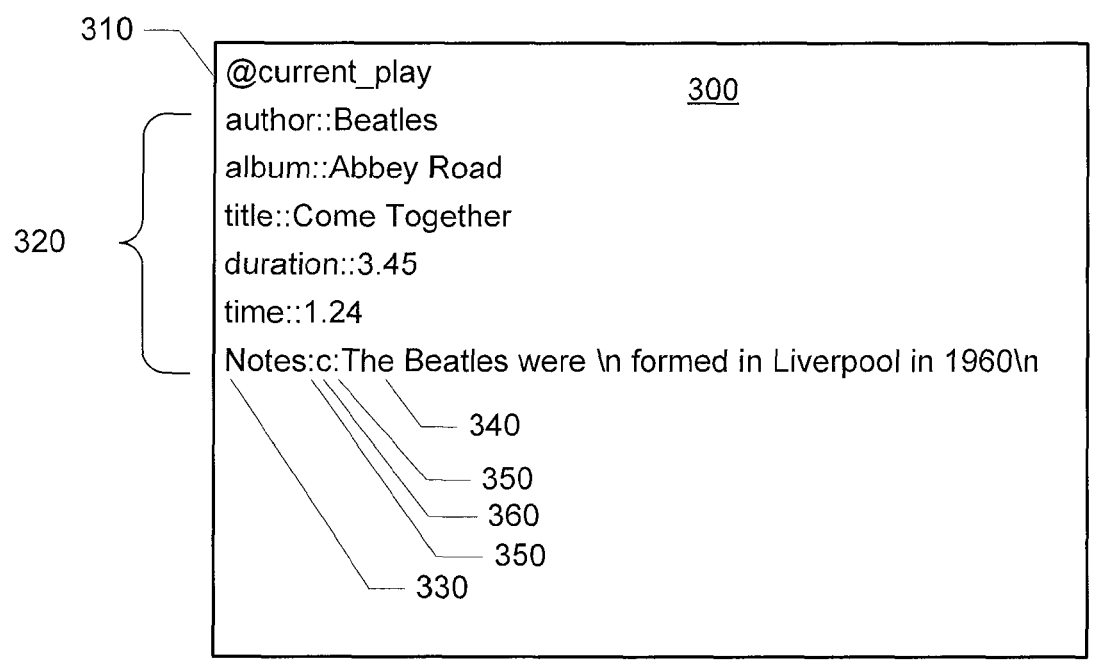
FIG. 3 is an exemplary logical publish-subscribe file.

FIG. 3 is an exemplary logical publish-subscribe file 300. The publish-subscribe file 300 may include an object identifier 310 which may comprise the name given to the file (e.g., current_play) preceded by an identifier prefix such as, for example, the character '@'. The publish-subscribe file 300 may or may not contain attributes 320. Each attribute 320 may comprise a tag, an encoding type, and a value (e.g., author:\t: Beatles). The tag 330 may identify the attribute name (e.g., author). The encoding type 360 (e.g., \t) may represents a type of data encoding that is applied to the value 340. The value 340 represents a value for the attribute (e.g., Beatles). The value 340 may be, for example, a sequence of characters excluding a linefeed character or a null character. The encoding type may, for example, be based on a programming language specific encoding types such as C programming language escape sequences (e.g., \n, \t). The tag 330, the encoding type 360 and the value 340 may be separated by a separator character 350 such as a colon (e.g., author:\t:Beatles). When the encoding type 360 is not provided (e.g., author::Beatles), a default encoding type may be used (e.g., a sequence of text characters terminated by a linefeed character). Successive attributes 320 may, for example, be separated by linefeed characters. In an alternative system, each attribute 320 may comprise a tag 330 and a value 340 separated by a separator character 350 without an encoding type. While the contents of the publish-subscribe file 300 are shown in human readable format; alternatively the contents of the publish-subscribe file 300 may be in a non-human readable format such as machine readable binary format.

Any of the one or more publisher applications 260 may invoke functions in the file system application programming interface 205 to cause creation of one or more objects, when the objects did not previously exist, and to publish events associated with the objects. A publisher application 260 may prepare to publish to an object by invoking a file open( ) function in the file system application programming interface 205 (hereinafter referred to as opening the file) in a write-only mode. Alternatively, the publisher 260 may open the publish-subscribe file 300 in a read-write-mode thereby both preparing to publish to and also subscribing to the object. The opening of the file may comprise a non-blocking operation. Opening a publish-subscribe file 300 that does not already exist may optionally cause the creation of the publish-subscribe file 300 with no attributes 320. Arguments provided by the publisher application 260 in the file open( ) function invocation may include any of: an object name, a pathname, a file name, an access mode, and/or other access points. The invocation of the file open( ) function may return a file descriptor or a file handle that may be used in subsequent invocations of other functions in the file system application programming interface to refer to the opened publish-subscribe file 300.

After a publisher application 260 has prepared to publish an object by opening the associated publish-subscribe file (e.g., any of publish-subscribe files 251, 252, 253, 254), the publisher application 260 may publish events associated with the object by invoking a file write( ) function in the file system application programming interface 205. When a new attribute 320 (e.g., one that does not already exist in the publish-subscribe file) is included, in a data element to the file write operation, the attribute 320 may be added to the publish-subscribe file. When an existing attribute 320 is included, in a data element to the file write operation, the corresponding attribute 320 in the existing publish-subscribe file 300 may be modified. A write operation containing, in a data element to the file write operation, an attribute tag preceded by an attribute deletion flag (e.g., '−') may delete the attribute. Opening a publish-subscribe file 300 in truncate mode may delete all existing attributes 320. The arguments in a file write operation may optionally include an object identifier.

Multiple publishers applications 260 may open and publish (e.g., write) to the same object. The different publishers 260 may for example, each update different attributes 320, or alternatively more than one publisher 260 may update the same attribute 320 in a publish-subscribe file 300. When one or more attributes 320 are included in a file write operation by the publisher 260, other existing attributes 320 in the publish-subscribe file 300 are not affected (e.g., not modified). When writing an object, a publisher 260 may associate a quality parameter with each attribute 320. In some systems, the attribute 320 in the publish-subscribe file 300 is only modified when the quality associated with the attribute 320 in the write operation is equal to or higher than a quality associated with the attribute 320 already contained in the publish-subscribe file 300. The quality may, for example, be an integer value between 0 and 9 with larger integers representing higher quality values. When no quality value is explicitly associated with an attribute 320 in a write operation, the quality may default to the lowest quality value (e.g., 0).

Any of the one or more subscriber applications 240 (through processors, controllers, etc.) may invoke functions in the file system application programming interface 205 to subscribe to one or more objects and to receive publish events associated with the objects. A subscriber application 240 (through processors, controllers, etc.) may subscribe to an object by opening the corresponding publish-subscribe file (e.g., any of publish-subscribe files 251, 252, 253, 254) in a read mode (e.g., read-only). The subscriber application 240 may receive publish events associated with the subscribed object by receiving a notification and responsive to the notification invoking a read ( ) function in the file system application programming interface 205 (hereinafter referred to as reading the file). Alternatively, the subscriber application 240 may receive publish events associated with the subscribed object by reading the file without receiving a notification.

The subscriber application 240 may open a publish-subscribe file 300 in either full or delta mode. When the publish-subscribe file 300 is opened in a full mode the subscriber may receive a single consistent version of the contents (e.g., identifier 310 and attributes 320) of the object whenever the publish-subscribe file 300 is read. When a publisher 260 publishes events associated with an object several times before a subscriber 240 reads the publish-subscribe file 300, the subscriber 240 may receive the current state of the publish-subscribe file 300 content at the time of the file read. In those circumstances where the subscriber 240 has also requested publication event notification for the object, the subscribe 240 may receive notifications for each subsequent publish event for the object.

The publish-subscribe system 200 may interface or couple many systems including one or more media players (not illustrated). A publish-subscribe file 300 may represent an object called current_play that models a currently playing media content item. A media player user interface may be a publisher application 260 that creates the current_play publish-subscribe file 300 and initially publishes the contents of author, album, title, duration and time attributes. A media playback manager may also be a publisher application 260 that repeatedly publishes updates to the time attribute as the play time of the media content item changes. The media player user interface may also be a subscriber application 240 that subscribes to the current_play publish-subscribe file 300, receives the events (e.g., updates) published by the media playback manager and refreshes a display of the media play time on the user interface.

When the publish-subscribe file 300 is opened in a delta mode, for example, the first time a subscriber 240 reads the publish-subscribe file 300, the entire contents (e.g., identifier 310 and attributes 320) of the publish-subscribe file 300 may be returned. After a successful file read operation, a change status for the object may be cleared (e.g., is set to unchanged). Subsequent readings of the publish-subscribe file 300, opened in delta mode, by the subscriber 240 may return the identifier 310 and only attributes 320 that have changed since a preceding successful read of the publish-subscribe file 300.

A non-blocking flag may be associated with the open publish-subscribe file 300 to allow the subscriber 240 to control (e.g., adapt) the behavior of the file read operation. When the contents of the publish-subscribe file 300 have not changed since a previous file read (e.g., the change status is unchanged), a file read with the non-blocking flag set may return immediately with no data, while a file read with the non-blocking flag clear (e.g., blocking) may wait until the object is changed and then returns the contents (e.g., attributes 320) that have changed. When not specified by the subscriber 240 in a file open( ) invocation, the non-blocking flag may be set (e.g., behavior is non-blocking) by default. The default behavior may ensure that standard file utilities do not block when reading a publish-subscribe file 300 that does not change. The subscriber application 240 may unsubscribe from the object by invoking a file close( ) function.

Multiple subscribers 240 may subscribe to (e.g., open) the same publish-subscribe file 300 in a delta mode. A separate change status is maintained for each subscriber 240 so that each subscriber 240 may see all of the changes made to the object. A successful file read( ) of the publish-subscribe file 300 by one subscriber 240 may not clear the change status for other subscribers 240 of the same publish-subscribe file 300.

The publish-subscribe system 200 may provide a notification mechanism. A subscriber 240 may request to receive a notification when a publish event occurs for a specified publish-subscribe file 300 (e.g., object). The notification request may, for example, be in the form of an ionotify( ) function call in accordance with a LINUX application programming interface or QNX Neutrino RTOS application programming interface. The notification may take the form of a PULSE, a SIGNAL, or a SEMAPHORE as described in any of POSIX, LINUX and QNX Neutrino RTOS, operating system specifications. In other systems, other similar notification mechanisms may be used. After receiving the notification, the subscriber 240 may invoke a read( ) function on the publish-subscribe file 300 to obtain the details of the publish event.

A subscriber 240 may subscribe to multiple objects by opening each of the associated publish-subscribe files (e.g., any of publish-subscribe files 251, 252, 253, 254). Alternatively, the subscriber 240 may subscribe to all objects that are contained in one directory by opening the directory (e.g., 226). Optionally, the publish-subscribe system 200 may provide a proxy file 255 having a predetermined name (e.g., '.all') in each directory and the subscriber 240 may open the proxy file 255 to subscribe to all objects that are contained in the corresponding directory. A read operation, of the directory 226, or of the proxy file 255, in full mode may return the contents of one of the publish-subscribe files (e.g., 252, 253 or 254) representing an object. Each subsequent read operation may return the contents of another publish-subscribe files representing the objects. A read operation in delta mode may return a queue of every attribute change in any of the publish-subscribe files. The results of the read operation in delta mode may span multiple publish-subscribe files.

FIG. 6 is an exemplary output of a read operation of a directory opened in a delta mode. In this figure the results include attributes from two publish-subscribe files—Time and PlayCurrent—contained in the opened directory. The results include two publication events for the 'position' attribute in the Time publish-subscribe file and one event for the attributes 'artist' and 'genre' in the publish-subscribe file PlayCurrent. When a new object (e.g., publish-subscribe file 300) is created in the opened directory, the subscriber 240 may receive a notification containing an object creation flag (e.g., '+') followed by the object identifier (e.g., +@objectname). When an existing object (e.g., publish-subscribe file 300) is deleted in the opened directory, the subscriber 240 receives a notification containing an object deletion flag (e.g., '−') followed by the object identifier (e.g., −@objectname).

Data elements provided to or returned by read( ) and write( ) function invocations may contain options for each line containing an object name 310 or an attribute 320. The options may be in the form of an open square bracket ('[') followed by one or more single letter options and followed (terminated) by a close square bracket (']'). When a letter option is preceded by a minus sign ('−') the option maybe cleared, otherwise the option is set. If the letter option is not specified, the option is not changed. An 'n' option may be used for non-persistence. When the non-persistence option is set for an attribute 320 the attribute will not be persisted when the object containing the attribute 320 is persisted. By default the non-persistence options may be cleared (e.g., persistent) for each attribute 320. The non-persistence option may be set on an objectname in which case the entire object will be not be persisted thereby overriding the non-persistence option on individual attributes 320 in the object. Some example attributes with options and there effects, may include:

[n]url::www.qnx.com Set no-persist option on this attribute

[-n]url::www.qnx.com Clear no-persist option on this attribute url::www.qnx.com No change to the current no-persist option on this attribute

[4] author::Beatles Change author if current quality is less then or equal to 4

A quality option may have values of 0 to 9. This option may set a quality associated with an attribute 320. When the option is not specified, the default quality may be set to '0' (e.g., the lowest possible value). In some systems, an attribute 320 is only modified when the quality associated with a new attribute value, in a write operation, is equal or greater than the quality associated with the current attribute value in the object. Use of this option may ensure that the quality of an attribute value will only increase when one or more publishers 260 provide asynchronous publication events containing the same attribute 320.

When an attribute name 330 is preceded by an attribute deletion flag (e.g., '-') in a write( ) function invocation, a corresponding attribute 320 maybe deleted from the object. When a publish-subscribe file 300 is opened in delta mode, receiving an attribute name 330 preceded by the attribute deletion flag (e.g., '-') from a file read operation may signify that the corresponding attribute 320 has been deleted from the object.

When a publish-subscribe file 300 is created or deleted, the publish-subscribe system 200 may queue a notification for each application (e.g., publishers 260 and subscribers 240) that has either the parent directory, of the created or deleted publish-subscribe file 300, or the corresponding proxy file opened in either full or delta mode. The notification may include a string such as, for example, '+@objectname' or '-@objectname' when the object is created or deleted respectively.

When an application (e.g., publishers 260 and subscribers 240) has a publish-subscribe file 300 open and the corresponding object is deleted, a read( ) function invocation may return a string such as, for example, -@objectname'. The publish-subscribe file 300 maybe closed when the corresponding object is deleted and only those applications 260, 240 that have a file descriptor from a previous open( ) are able to continue to access the publish-subscribe file 300.

File system utilities or commend-line utilities may be used to debug file system nodes (e.g., publish-subscribe files and directories) used in the publish-subscribe system 200. For example, a command to display all objects in the publish-subscribe system 200 may look like:

is -IR/fs/ps/

A command to display the current state of two objects may look like:

cat/fs/ps/media/PlayCurrent cat/fs/ps/flash/apps/youtube

A command to change the attributes of an object may look like:

echo "attr::value">>/fs/ps/objectfilename

Figure 7:
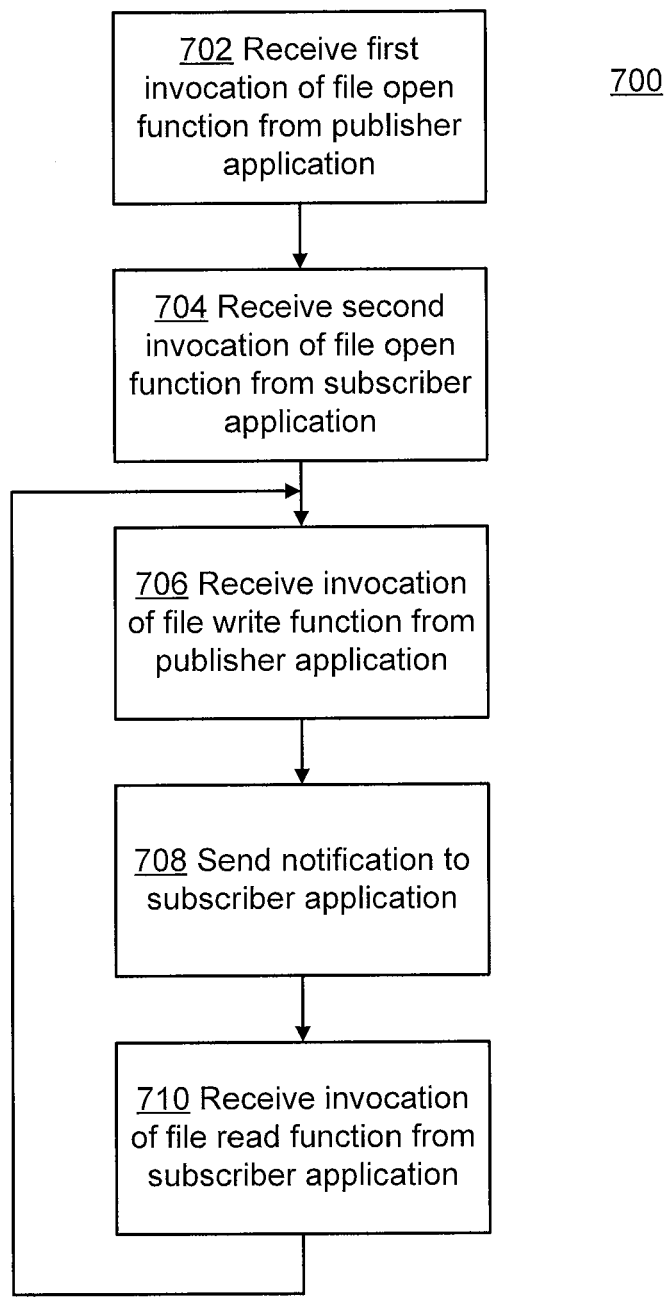
FIG. 7 is an exemplary publish-subscribe process.

FIG. 7 is an exemplary publish-subscribe process. At 702 a first invocation of the file open( ) function for a publish-subscribe file 300 is received from a publisher application 260. The first invocation of the open( ) function may include a name of the publish-subscribe file 300. The publish-subscribe file 300 may represent a publish-subscribe object. At 704 a second invocation of the file open( ) function for the publish-subscribe file 300 is received from a subscriber application 240. The second invocation of the open( ) function may include the name of the publish-subscribe file 300. The subscriber application 240 may subscribe to the publish-subscribe object represented by the publish-subscribe file 300. At 706 one or more invocations of the file write( ) are received from the publisher application 260. The write( ) function invocations correspond to publication events for the object generated by the publisher application 260. At 708 an optional notification is sent to the subscriber application 240 responsive to receiving each write( ) invocation at 706. At 710 one or more invocations of the file read( ) function are received from the subscriber application 240. The invocation of the read( ) function may be responsive to the notification sent at 708. The subscriber application 240 receives notification of the publish events for the object via the notification of step 708 and the read( ) function invocations of step 710. Steps 706, 708 and 710 may be repeated for subsequent invocations of the file write( ) function by the publisher application 260, sending of the notifications, and invocations of the file read( ) function by the subscriber application 240. The file open( ), write( ) and read( ) functions may be provided by a file system application programming interface 205. The file system application programming interface 205 may be compliant with many standards such as a POSIX compliant application programming interface.

Figure 4:
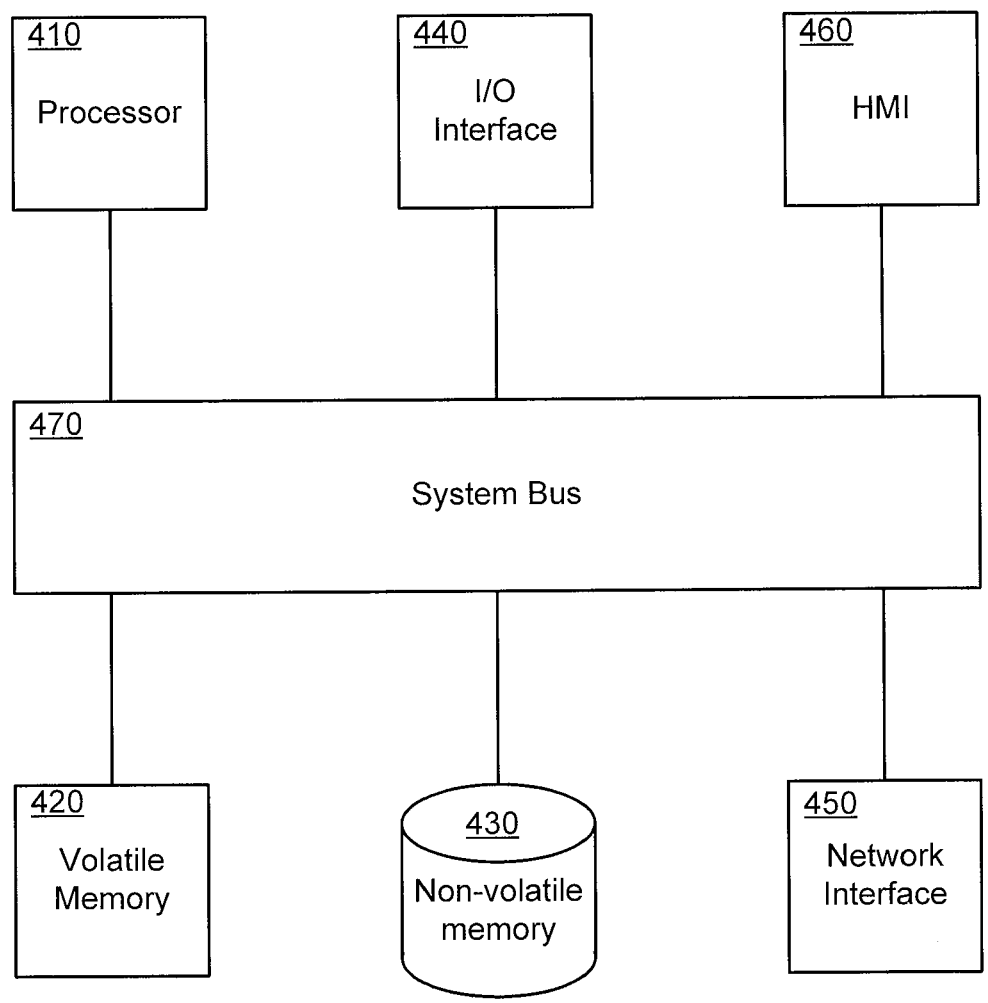
FIG. 4 is an exemplary system of FIG. 2.

FIG. 4 is an exemplary publish-subscribe system 200. The computing platform 400 comprises a processor 410, volatile memory 420, non-volatile memory 430, an input/output (I/O) interface 440, a network interface 450, an optional human-machine interface (HMI) 460, and a system bus 470. The volatile memory 420 may, for example, include random access memory (RAM). The non-volatile memory 430 may include, for example, a hard disk drive (HDD) or a Flash memory device. The system bus 470 provides for communications and interoperation between the other components 410, 420, 430, 440, 450, 460 of the computing platform 400.

Figure 5:
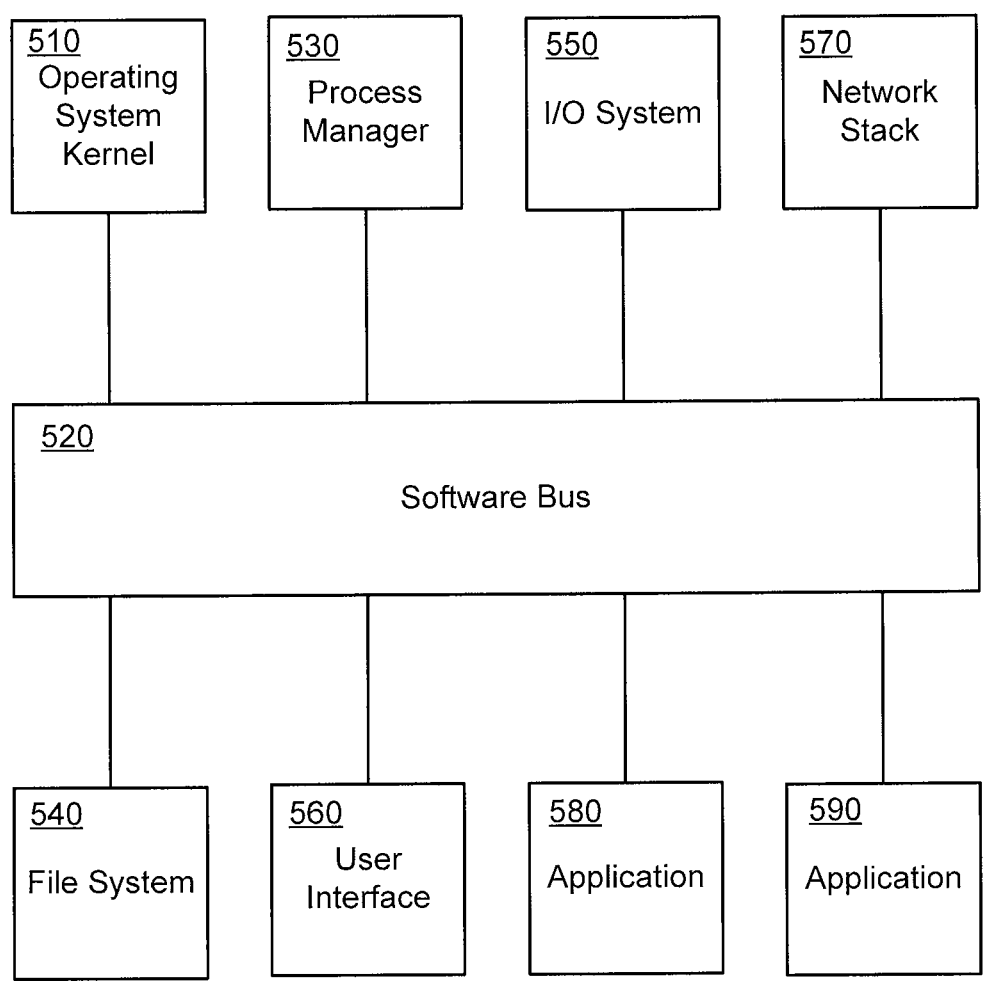
FIG. 5 is a second exemplary system of FIG. 2.

FIG. 5 is a second exemplary publish-subscribe system 200 that may be integrated within or separate from the system of FIG. 4. The exemplary functional components 500 comprise an operating system kernel 510, a software bus 520, a process manager 530, a file system 540, an input/output (I/O) system 550, a user interface 560, a network stack 570, and one or more applications 590. The software bus 520 provides for interoperation between the other components 510, 530, 540, 550, 560, 570, 580, and 590 of the arrangement 500 via inter-process communications (e.g., messaging, remote procedure calls (RPC)). The functional components 510, 520, 530, 540, 550, 560, 570, 580, 590 may be implemented using processor 410 executable instructions stored in processor accessible memory including volatile memory 420 and non-volatile memory 430. When a host computing platform is running, the publish-subscribe nodes (e.g., directories and publish-subscribe files) may be maintained in volatile memory. The publish-subscribe system 200 may save objects to a persistent (e.g., non-volatile) store on demand (e.g., on a file close or flush) while running or at shutdown.

The minimum unit of persistence may be a publish-subscribe directory or sub-directory (e.g., 224, 225 or 226). All or some of the objects in the publish-subscribe directory may be written to persistent store in a single atomic operation as a single file. Saving the contents (e.g., objects) of the publish-subscribe directory as a single entity (e.g., file) may ensure that objects in the publish-subscribe directory that contain related or linked data are self-consistent. Only the current state (e.g., contents) of each object (e.g., publish-subscribe file) may be saved to persistent memory in some systems. For publish-subscribe files 300 that are open in delta mode when they are saved to persistent memory, the queue of changes (e.g., deltas) may be lost and only the current state of the contents of the object may be saved. When the publish-subscribe is restored from the saved file (e.g., at start-up), each of the objects contained in the publish-subscribe directory may be recreated in a volatile (or non-volatile) store of a storage media. Alternatively, the minimum unit of persistence may be all of the directories, sub-directories and objects under the publish-subscribe mount-point 223. In a further alternative, the minimum unit of persistence may be individual publish-subscribe files (e.g., objects) that may each be written to persistent store in a separate operation. On start-up the file system may restore all publish-subscribe nodes from the persistent store to volatile memory immediately or alternatively each object may be restored when it is first accessed (a.k.a. deferred loading).

Other alternate systems and methods may include combinations of some or all of the structure and functions described or shown in one or more or each of the figures. These systems or methods are formed from any combination of structure and function described or illustrated within the figures. Some alternative systems or devices are compliant with one or more transceiver protocols. Wireless connectivity between publish-subscribe systems, and one or more wireless networks provide high speed connections that allow users to initiate or complete a communication at any time while stationary or on the move. The wireless connections may provide access to, or transmit, static or dynamic content (live audio or video streams, for example). The content maybe related to entertainment, transactions, or any area or interests.

Each of the systems and methods may be encoded in a signal bearing medium, a computer readable medium such as a memory, programmed within a device such as one or more integrated circuits, or processed by a controller or a computer. If the methods are encoded in software, the software may reside in a memory resident to or interfaced to any other type of non-volatile or volatile memory interfaced, or resident to a communication device. The memory may include an ordered listing of executable instructions for implementing logical functions. A logical function may be implemented through digital circuitry, through source code, through analog circuitry, or through an analog source such through an analog electrical, or optical signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, a non-transitory apparatus, or device that may also execute instructions.

A "computer-readable medium," "machine-readable medium," and/or "signal-bearing medium" may comprise any apparatus that contains, stores, communicates, or transports data and/or software for use by or in connection with an instruction executable system, apparatus, or device. The machine-readable medium may selectively be, but not limited to, an electronic, magnetic, optical, electromagnetic, infrared, or semiconductor system, apparatus, devices. A non-exhaustive list of examples of a machine-readable medium would include: an electrical connection "electronic" having one or more tangible connections, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical).

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A method in a computer system for publish-subscribe comprising:
   receiving from a publisher application a first invocation of a file open function in a file system application programming interface in the computer system including a name for a publish-subscribe file;
   preparing to publish an object associated with the publish-subscribe file in response to the first invocation of the file open function executed by a file system;
   receiving from the publisher application one or more invocations of a file write function in the file system application programming interface in the computer system;
   adding, modifying or deleting one or more attributes contained in the publish-subscribe file by a processor of the computer system through the file system in response to data elements included in each file write invocation;
   receiving from a subscriber application a second invocation of the file open function in the file system application programming interface in the computer system including the name for the publish-subscribe file; and
   subscribing by the subscriber application to the publish-subscribe file in response to the second invocation of the file open function executed by the file system;
   sending a notification to the subscriber application responsive to receiving, from the publisher application, any of the one or more invocations of the file write function;
   receiving from the subscriber application one or more invocations of a file read function including an identifier of the publish-subscribe file in the file system application programming interface in the computer system; and
   returning, by the processor in response to arguments included in each file read invocation executed by the file system, either all of the attributes contained in the publish-subscribe file, or one or more attributes contained in the publish-subscribe file that have changed since a previous invocation of the file read function;
   where each of the one or more invocations of the file read function by the subscriber application is further responsive to the sending of the notification.

2. The method of claim 1, further comprising:
   receiving from a second publisher application a third invocation of the file open function in the file system application programming interface in the computer system including the name for a second publish-subscribe file; and
   receiving from the second publisher application one or more further invocations of the file write function in the file system application programming interface in the computer system and, responsive to arguments included in each further file write invocation, adding, modifying or deleting one or more attributes contained in the second publish-subscribe file.

3. The method of claim 2, further comprising:
   receiving from the subscriber application a fourth invocation of the file open function in the file system application programming interface in the computer system including a name for the second publish-subscribe file; and
   receiving from the subscriber application one or more further invocations of a file read function in the file system application programming interface in the computer system and, responsive to arguments included in each further file read invocation, returning either all of the attributes contained in the second publish-subscribe file, or alternatively one or more attributes contained in the second publish-subscribe file that have changed since a previous invocation of the file read operation for the second publish-subscribe file.

4. The method of claim 1, where any of the attributes in the one or more file write invocations further includes a quality parameter; and a corresponding attribute in the publish-subscribe file is modified only when the quality parameter included with the attribute in the file write invocation is equal to or greater than a quality parameter associated with the corresponding attribute in the publish-subscribe file.

5. The method of claim 1, where the file system application programming interface in the computer system comprises a POSIX compliant application programming interface.

6. The method of claim 1, where the file system application programming interface comprises a POSIX interface.

7. The method of claim 1, where the processor is programmed to execute any of the one or more file read functions as one or more non-blocking events and returns from a file read operation when there have been no changes in the publish-subscribe file since a prior invocation of the file read function.

8. The method of claim 1, where the processor is programmed to execute any of the one or more file read function as one or more blocking events and defers returning from a file read operation, when there have been no changes in the publish-subscribe file since a previous invocation of the file read function until at least one attribute in the publish-subscribe file is added, modified or deleted.

9. The method of claim 1, where the processor is programmed to create the publish-subscribe file when the first invocation of the file open function is invoked by the file system and the publish-subscribe file does not exist.

10. A method for publish-subscribe comprising:
receiving from one or more publisher applications one or more invocations of a file open function in a file system application programming interface coupled to a file system in a computer system each invocation including a name for one of one or more publish-subscribe files in a directory;
preparing to publish an object associated with a publish-subscribe file of the one or more publish-subscribe files, and opening the publish-subscribe file, in response to a first invocation of the file open function;
receiving from the one or more publisher applications one or more invocations of a file write function in the file system application programming interface coupled to the file system in the computer system, each invocation directed to one of the one or more publish-subscribe files;
adding, modifying or deleting one or more attributes contained in the one of the one or more publish-subscribe files by the file system using a processor of the computer system in response to data elements included in each file write function;
receiving from a subscriber application a second invocation of the file open function in the file system application programming interface coupled to the file system in the computer system including the name for the directory or a name of a proxy file associated with the directory;
subscribing by the subscriber application to the directory or the proxy file, and opening the directory or the proxy file, in response to the second invocation of the file open function;
sending a notification to the subscriber application responsive to receiving each invocation of the file write function from any of the one or more publisher applications;
receiving from the subscriber application an invocation of a file read function including an identifier for the directory or the proxy file associated with the directory in the file system application programming interface in the computer system; and
reading each of the one of the one or more publish-subscribe files, by the processor in response to arguments included in the file read function, and returning either all of the attributes contained in each of the one of the one or more publish-subscribe files, or one or more attributes contained in each of the one of the one or more publish-subscribe files that have changed since a previous invocation of the file read function;
where the invocation of the file read function by the subscriber application is further responsive to the sending of the notification.

11. The method of claim 10, further comprising:
sending a second notification to the subscriber application responsive to creation or deletion of any of the one or more publish-subscribe files in the directory; and
where the file read function further returns the name of the created or deleted publish-subscribe file and a file creation or deletion indicator.

* * * * *